(No Model.)
W. D. ARNETT.
SEEDING MACHINE.
No. 358,247. Patented Feb. 22, 1887.
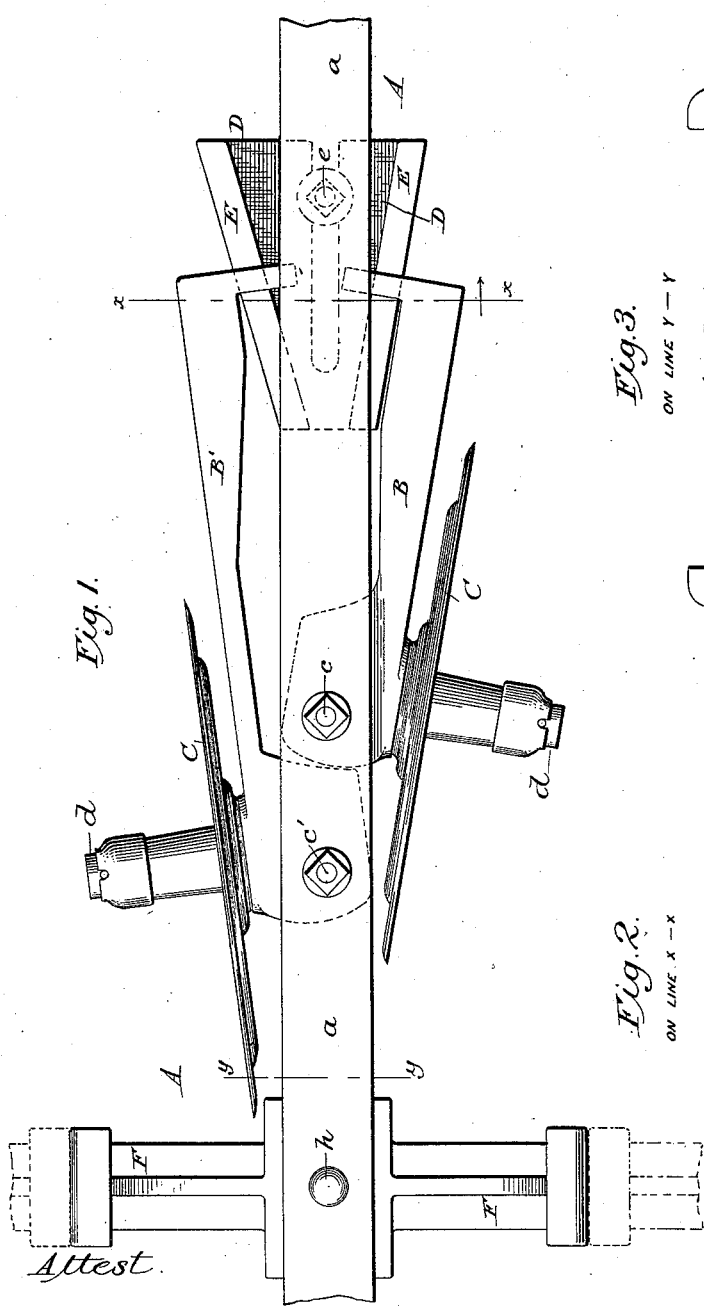
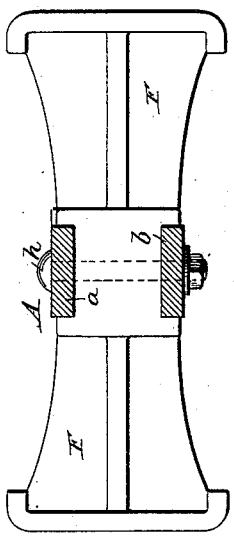
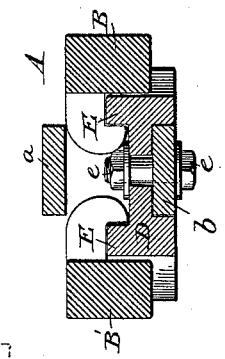
Attest.
Sidney P. Hollingsworth
Wm. Kennedy
Inventor.
W. D. Arn
By his

UNITED STATES PATENT OFFICE.

WILLIAM D. ARNETT, OF DENVER, COLORADO.

SEEDING-MACHINE.

SPECIFICATION forming part of Letters Patent No. 358,247, dated February 22, 1887.

Application filed July 30, 1886. Serial No. 209,547. (No model.)

*To all whom it may concern:*

Be it known that I, WILLIAM D. ARNETT, of Denver, in the county of Arapahoe and State of Colorado, have invented certain Improvements in Seeding-Machines, of which the following is a specification.

My invention relates to that class of seeding-machines in which the beams or drag-bars are provided with disks arranged obliquely to the line of travel for the purpose of opening the seed-receiving furrows, and particularly to those machines in which each drag-bar carries two disks arranged on opposite sides and inclined in opposite directions with reference to the line of progression.

The aims of the present invention are more particularly to provide improved means for connecting the disks to the drag-bar and effecting their horizontal adjustment in relation thereto, and the improved devices are more particularly designed for use in connection with drag-bars of the form represented in my application for Letters Patent of the United States filed on the 22d day of May, 1886, Serial No. 203,029.

In the accompanying drawings, Figure 1 represents a top plan view of the rear portion of a drag-bar having my improvements embodied therein; Fig. 2, a cross-section of the same on the line $x\,x$; Fig. 3, a cross-section on the line $y\,y$.

Referring to the drawings, A represents the drag-bar, consisting, as in my previous application, of two horizontal metal straps or bars, $a$ and $b$, one overlying the other, with a vertical space of one or two inches between them. The forward ends of these bars may be formed and jointed to the frame of the machine in the manner represented in my said application, or in any other appropriate manner.

In carrying the present invention into effect I provide two metal plates, B and B', insert their forward ends between the upper and lower members of the drag-bar, and confine them in place by means of independent vertical pivots $c\,c'$, so that their rear ends may swing inward and outward horizontally. Each of these plates is provided near the forward end, in line with its vertical pivot, or substantially so, with an outwardly-projecting journal, $d$, serving to receive and carry the adjacent disk C, by which the furrow is opened. This disk may be constructed in all respects like the disk represented in my application for Letters Patent above referred to, or like that represented in application Serial No. 199,137, filed April 5, 1886, or otherwise constructed, as preferred. For the purpose of effecting the lateral adjustment of the plates B B', to vary the inclination or obliquity of the furrow-opening disks, and to secure them in the required positions, I insert between the upper and lower members of the drag-bar a horizontally-sliding wedge-plate, D, grooved or flanged to embrace the edges of one member of the drag-bar, so that it will be guided thereby, and provided along its edges with flanges E, which enter notches formed in the rear ends of the respective plates B B', as plainly shown in Figs. 1 and 2. These flanges serve not only to hold the swinging plates in position, but as the wedge is moved endwise they swing the plates inward or outward in unison. The position of the flanges is such that they move the two plates in the proper manner to effect an equal adjustment of the two disks C. The wedge is slotted longitudinally and secured in position by means of a clamping-bolt, $e$, extended downward through the lower member of the drag-bar.

It will be observed that the disk-supporting plate B' is longer than its companion, B, and is pivoted at a point farther forward on the drag-bar, and that each plate has its journal $d$ located near its forward end, one in advance of the other. This arrangement of the journals out of line with each other permits me to place the furrow-opening disks out of line—or, in other words, one in advance of the other—thus affording increased space for the introduction of the seed spouts or conductors, which will pass downward, as in my previous application, close to the inner faces of the respective disks. The arrangement is also advantageous in that it permits the vertical pivot-bolts to be placed substantially in line with the axes of the respective disks, so that the horizontal adjustment of the supporting-plates does not materially move the disks laterally, and consequently does not vary appreciably the distance between the furrows.

While I prefer to arrange the supporting and adjusting devices inside of a two-part drag-bar, as herein described, it will of course be understood that they may be applied to drag-bars of other forms, and it will also be understood that the location of one disk in advance of its companion is a feature which may be retained, notwithstanding changes in the construction of their supporting devices.

For the purpose of preventing the drag-bars from swinging laterally in relation to each other—or, in other words, for holding them at the proper distance apart—I apply to the drag-bar a cross arm or plate, F. This arm is passed between the upper and lower members of the drag-bar, flanged or grooved to embrace their edges, and secured firmly in position by a central bolt, $h$. Its ends are widened and formed with vertical faces to bear against the corresponding faces of the plates on the adjacent drag-bar. Applied within the drag-bar, as shown, the plate serves as a means of maintaining a proper separation of its two members, $a$ and $b$.

I do not claim, broadly, in this application the employment of wedges between the rear ends of disk-supporting arms to force them outward.

It will be observed as a peculiarity of the present construction that a single wedge adjusts both plates, and that the wedge and plates interlock in such manner that the wedge serves to hold the plates inward as well as to force them outward.

I am aware that a triangular harrow-frame has been provided on opposite sides with circular colters or shares inclined in opposite directions from the line of draft and pivoted to the frame for independent adjustment in a horizontal direction, and this I do not claim.

I believe myself to be the first to provide a drag-bar with two furrow-opening disks inclined in opposite directions and arranged one in advance of the other.

Having thus described my invention, what I claim is—

1. The combination, substantially as described, of a drag-bar, two disk-supporting plates pivoted to said bar to swing horizontally, and an adjustable wedge attached to the drag-bar and formed at its edges to engage and hold the swinging plates, substantially as described.

2. The combination of the drag-bar, the adjustable wedge grooved or flanged to embrace said bar, and the horizontally-movable disk-supporting plates B B', having their rear edges notched to engage the edges of the wedge, whereby the plates may be adjusted both inward and outward by the movement of the wedge and secured in position.

3. In combination with the drag-bar having the upper and lower members, $a\ b$, the intermediate pivoted plates, B B', notched at their ends, the wedge D, provided at its edges with flanges engaging the plates, and the fastening-bolt $e$, substantially as described.

4. In a seeding-machine, the combination of a drag-bar and two furrow-opening disks attached to opposite sides of said bar, one in advance of the other and inclined in opposite directions from the line of draft, substantially as and for the purpose described.

5. In a seeding-machine, a drag-bar and two furrow-opening disks arranged on opposite sides of the same and inclined horizontally in opposite directions with reference to the line of draft, one located in advance of the other, in combination with two independent plates supporting the respective disks and connected to the drag-bar by independent vertical pivots located one in advance of the other.

6. In a seeding-machine, the combination of a drag-bar, two plates, B B', pivoted to said drag-bar at different points in its length, and two furrow-opening disks, C C, mounted on the respective plates, one in advance of the other.

7. In combination with the drag-bar having the upper and lower members, $a\ b$, the spacing-plate F, inserted between and bolted to said members and extended laterally beyond the same, in the form and manner substantially as described.

In testimony whereof I hereunto set my hand, this 19th day of July, 1886, in the presence of two attesting witnesses.

WILLIAM D. ARNETT.

Witnesses:
W. J. ACHESON,
WM. SCOTT LEE.